Nov. 27, 1934. J. BEDFORD 1,982,150
HYDRAULIC TRANSMISSION MECHANISM
Filed Oct. 5, 1931 8 Sheets-Sheet 1

Nov. 27, 1934.  J. BEDFORD  1,982,150
HYDRAULIC TRANSMISSION MECHANISM
Filed Oct. 5, 1931  8 Sheets-Sheet 3

J. Bedford
INVENTOR

By: Marks & Clark
Attys.

Nov. 27, 1934.  J. BEDFORD  1,982,150
HYDRAULIC TRANSMISSION MECHANISM
Filed Oct. 5, 1931   8 Sheets-Sheet 4

Fig. 7

J. Bedford
INVENTOR

By Marks & Clerk
ATTYS

Nov. 27, 1934.  J. BEDFORD  1,982,150
HYDRAULIC TRANSMISSION MECHANISM
Filed Oct. 5, 1931   8 Sheets-Sheet 5

Fig. 8

Nov. 27, 1934.                J. BEDFORD                    1,982,150
                    HYDRAULIC TRANSMISSION MECHANISM
                      Filed Oct. 5, 1931       8 Sheets-Sheet 7

Fig.10.

J. Bedford
INVENTOR
By: Marks & Clerk

Nov. 27, 1934.    J. BEDFORD    1,982,150
HYDRAULIC TRANSMISSION MECHANISM
Filed Oct. 5, 1931    8 Sheets-Sheet 8

J. Bedford
INVENTOR
Marks & Clerk
ATTYS.

Patented Nov. 27, 1934

1,982,150

UNITED STATES PATENT OFFICE 1,982,150

HYDRAULIC TRANSMISSION MECHANISM

Jesse Bedford, Luton, England, assignor of one-half to Matthew Clough Park, Luton, England Application October 5, 1931, Serial No. 567,093
In Great Britain October 6, 1930

9 Claims. (Cl. 60—54)

This invention relates to hydraulic transmission gears of the kind embodying a reciprocating pump which operates to circulate a working fluid and also embodies a system of vanes or the like associated with a stationary part of the gear such that dynamic torque may be created from the kinetic energy of the working fluid.

Such a form of gear is described in British patent specification No. 352034, and in United States Patent No. 1,952,354.

It is the object of the present invention to provide improved gears of the above kind.

It is also an object of the present invention to provide modifications in the forms of gear as covered by the above-numbered patents.

According to the present invention apparatus of the above kind is provided comprising a tilting or swash plate for operating the fluid circulating pump.

According to one form of the invention the said tilting or swash plate is adjustable as to its inclination or throw and in a modification a pair of tilting or swash plates is provided which may be oppositely inclined relatively to the axis of the shaft upon which they are mounted and pistons of the fluid reciprocating pump are alternately connected to said plates.

Further features of the invention will be apparent from the description given hereafter with reference to the accompanying drawings, in which:—

In the following description like reference numerals are used throughout the figures to represent like parts.

In carrying the invention into effect in one convenient manner as illustrated in Figures 1 to 6 the driving and driven shafts are denoted by the references 1 and 2 respectively and the casing of the gear by 3. Pivotally mounted on the driving shaft 1 by means of trunnions 4 are two pairs of tilting or swash plates, each of which pairs comprises an inner tilting member or plate 5 and an outer tilting member 6. These members are provided with ball bearings on their outer peripheries through which they engage with tilting rings 7, 8 which have the ball ends of connecting rods 9 journalled therein. The connecting rods 9 are similarly journalled at their opposite ends in pistons 10 arranged to slide in bores 11 formed in a cylinder block 12 which is rigidly connected to the following shaft 2 by suitable means such as an extension 13 formed on the end thereof. The rings 7, 8 are universally connected to one another and to the cylinder block through the medium of gimbal rings 14, 15 respectively. Thus, referring to Figure 2, a tilting ring 7 is connected with a gimbal ring 14 by two coaxial pins 16 while along an axis at right angles to that of the said pins 16 other coaxial pins 17 connect together the gimbal ring 14, the tilting ring 8 and the gimbal ring 15. Then, again on an axis at right angles to this and therefore coaxial with that of the first pins 16, the gimbal ring 15 is pivotally connected to the cylinder block 12 by integrally formed trunnion pins 18.

Figures 1, 6:
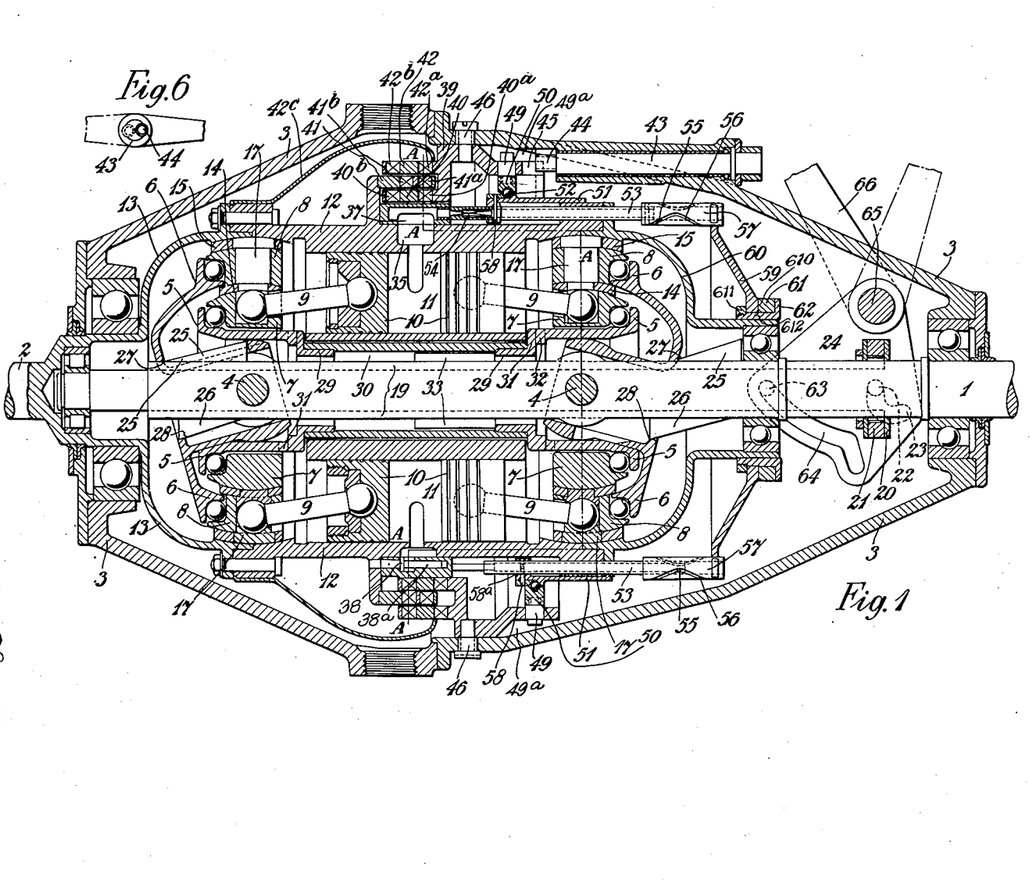
Figure 1 is a sectional side elevation of one form of gear in accordance with the invention.
Figure 6 illustrates a part of the reverse gear control mechanism.
Figure 2:
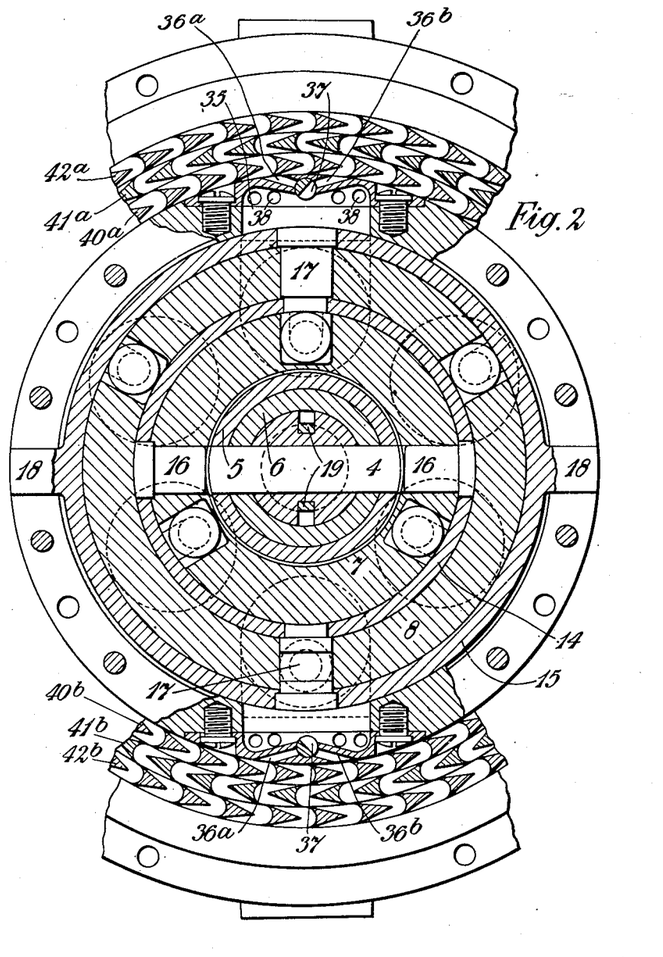
Figure 2 is a sectional end elevation of Figure 1 taken on the line A—A, the operative parts being shown arranged for forward drive in the upper halves of Figures 1 and 2 and for reverse in the lower.

The cylinder block 12 contains an even number of bores 11 and the pistons 10 therein are alternately connected as shown by the connecting rods 9 to the tilting rings 7, 8. The alternate sets of cylinder bores may conveniently be set at two different radii so as to avoid excessive angularity of the connecting rods. As shown in these figures the tilting members 5, 6 are in a position in which the ball bearings carried by them lie in a plane at right angles to the axis of the shafts 1, 2. Evidently, however, if they are tilted about the trunnions 4, by means presently to be described, rotation of the shaft 1 relative to the cylinder block 12 and following shaft 2 will cause these members 5, 6 to impart an oscillating movement to the tilting rings 7, 8 which will result in the pistons 10 being reciprocated in their cylinders, the amount of such reciprocation being proportional to the angle of tilt. The members 5, 6 are arranged to be tilted in opposite angular directions about the pin 4 so that by virtue of the alternate connection of the pistons 10 to the rings 7, 8 the system as a whole will be perfectly balanced both for torque and dynamic forces and couples.

The means for tilting the outer tilting members 6 comprises a pair of keys 19 slidably mounted in diametrically opposed slots formed in the driving shaft 1 and secured to a collar 20 having a ring 21 rotatably mounted therein which ring is formed with pins 22 engaging cam slots 23 formed in cam plates 24, the arrangement being such that actuation of the cam plates 24 will cause the collar 20 and hence the keys 19 to move axially along the shaft 1. The keys 19 are formed with wedge pieces 25, 26 arranged to engage with the outer tilting members 6 at the portions 27, 28 thereof so that axial movement of the keys 19 produced by the cam plates 24 will thereby impart a tilt to these members.

The means for tilting the inner members 5 comprises face cams 29 secured to a sleeve 30 rotatably carried in the cylinder block 12 having cam surfaces 31 formed thereon to engage corresponding surfaces 32 formed on the members 5 so that a rotational movement of the sleeve 30 and the cams 29 carried thereby will impart a tilt to the said members. Such rotation is effected from the keys 19 by means of members 33 formed integrally therewith and which engage helical slots 34 in the sleeve 30. Thus actuation of the cam plates 24 will, through the medium of the keys 19, cause the members 5 and 6 to take up oppositely tilted positions.

The middle portions of the cylinders 11 communicate with chambers 35 which are each provided with two nozzles $36^a$, $36^b$ under the control of a rotatable valve 37 and also with non-return inlet valves, the heads of which are indicated at 38 and the stems at $38^a$. Immediately adjacent the exits of the nozzles $36^a$ or $36^b$ is an assembly of three vane rings of which the innermost vane ring 40 and the outermost vane ring 42 form part of a stationary member 39 which is attached to the casing 3 while the intermediate vane ring 41 is secured to the rotatable cylinder block 12.

In the operation of the gear reciprocation of the pistons 10 causes the working fluid to be entrained through the inlet valves 38 into the cylinders 11 and ejected through the nozzles $36^a$ or $36^b$ to impinge against the vane rings. A shroud $42^c$ is provided to enclose and direct the circulation of the working fluid. The vane rings are each arranged in two sets $40^a$, $41^a$, $42^a$ and $40^b$, $41^b$, $42^b$, those in the former set being directed opposite to those in the latter set. Similarly the two nozzles $36^a$, $36^b$ are oppositely arranged in directions corresponding to forward and reverse drive and means are provided so that whichever nozzle is in action a corresponding set of vanes will be associated therewith in order to effect either forward or reverse drive. A reverse gear operating spindle 43 journalled in the casing carries an eccentric pin 44 engaging a groove 45 formed in the member 39 which is slidably and rotatably mounted in the casing. Rotation of this spindle will therefore impart a rotary movement to the member 39 which movement is translated into an axial movement by guide pins 46 secured to the casing and engaging inclined slots 47 formed in the member 39. Such movement serves to bring the vanes $40^a$ and $42^a$ into alignment with the nozzles $36^a$ and the vanes $41^a$ or the vanes $40^b$ and $42^b$ with the nozzles $36^b$ and the vanes $41^b$, the vanes 41 and the nozzles $36^a$ and $36^b$ being themselves permanently aligned. Other inclined slots 48 formed in the member 39 engage with pins 49 carried by a ring 50 which pins also engage axial slots $49^a$ formed in the casing 3 so that the axial and rotary movements of the member 39 may combine to impart an amplified axial movement to a sleeve 51 through the medium of the ring 50 and a ball bearing 52. Hollow spindles 53 slidably engaging at one end with squared extensions 54 of the rotary valves 37 are provided at the other end with pins 55 engaging with inclined slots 56 in hollow cam members 57. Axial movement of the sleeve 51 corresponding to axial movement of the member 39 transmitted to the spindles 53 by the pins 58, causes rotation of the said spindles by the interaction of the pins 55 and the cam slots 56 so as to reverse the position of the valves 37 and bring alternate nozzles $36^a$ and $36^b$ into action. The pins 58 pass through holes in the spindles 53, the holes being elongated circumferentially as shown at $58^a$ so as to allow the said spindles to rotate the required amount. A member 59 carries the cams 57 at its periphery and is arranged to be moved axially upon an extension 60 of the cylinder block 12 through the medium of a ring 61 carried between a collar 62 and the surface 610 of the member 59, the said ring being formed with pins 63 to engage with slots 64 formed in the cam plates 24 and the said collar 62 being secured upon the extension 60 by a nut 611 screwed onto the stem 612 of the collar.

Figure 3:
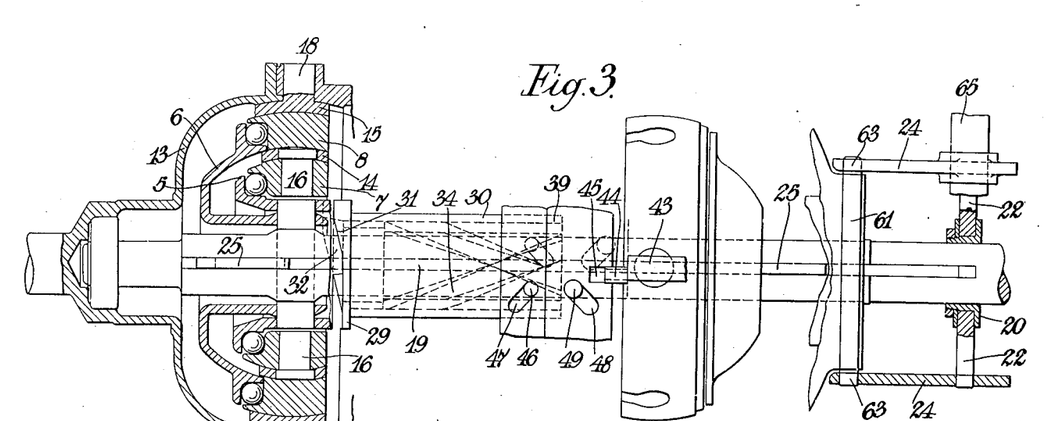
Figure 3 is a part sectional view showing control mechanism for the gear.

The cam plates 24 are carried by a spindle 65 and a suitable lever 66 is provided by means of which they may be partially rotated in order to actuate the control mechanism.

Figure 4:
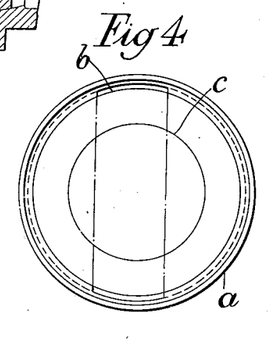
Figures 4 and 5 illustrate a method of constructing a gimbal ring as used in the above form of gear.
Figure 5:
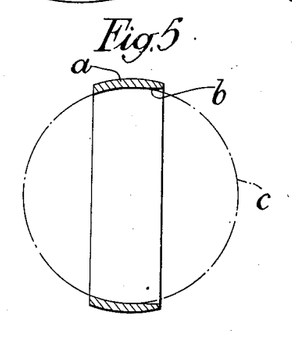

Figures 4 and 5 illustrate a convenient method of forming a spherical outer ring, such as a gimbal ring or tilting ring, so as to receive an inner ring without the necessity of adopting a split construction for the outer ring. The outer ring $a$ is provided on one side with an axially extending recess $b$ which forms part of a cylinder having a diameter equal to that of the spherical ring $c$ to be inserted therein. Through this recess the ring $c$ is inserted edgewise until it is in the position shown by chain dotted lines and is then turned through a right angle into its working position, as shown in Figure 4.

Referring to the operation of the gear it will first be assumed that it is filled with a suitable working fluid, such as oil, and that the driving shaft 1 is freely rotating with the tilting plates in neutral position and the vane control set for forward driving as shown in the upper halves of Figures 1 and 2. In this condition no motion will be transmitted to the following shaft. If, however, the lever 66 be now operated to turn the cam plates 24 the radial portions of the grooves 23 will coact with the pins 22 to impart a tilt to the members 5, 6 through the medium of the keys 19 as previously described and by virtue of this tilt the rotation with the driving shaft of these members will cause reciprocation of the pistons 10. The working fluid will thereby be alternately drawn in through the inlet valves 38 and expelled through the nozzles 36ª and impinging thereafter upon the series of blade rings will exert a dynamic force upon these vanes.

The above actions result in two distinct but cumulative driving torques being imparted to the cylinder block and following shaft attached thereto. Firstly, the resistance of the working fluid to circulation will result in a resistance to the reciprocation of the pistons and this will cause what may be termed a "static" torque or drag to be applied to the cylinder block. Secondly, the pressure exerted by the working fluid on the vanes will apply a dynamic torque to the cylinder block. It will be observed that the working fluid is turned through as nearly as possible 180° at each vane or stage, finally issuing at the peripheral speed of the cylinder block, thus delivering the whole of its kinetic energy relative thereto as far as practicable.

In the condition described the latter torque is at a maximum relatively to the static torque. Operation of the cam plates 24 continuing, the tilting members 5, 6 will finally reach their position of greatest tilt, the velocity ratio between the driving and following shafts progressively decreasing meanwhile, until at this point the pins 22 enter the circular portion of the grooves 23 and will therefore receive no further axial displacement. At the same time the pins 63 which have similarly been hitherto "dwelling" in the circular portion of the grooves 64 will be engaged by the inclined portions thereof and axial movement will be imparted to the member 59 and the cams 57. This axial movement will result through the medium of the cam grooves 56 and the pins 55 in the rotation of the valves 37 and the progressive closing of the nozzles 36ª. Such closing will increasingly impede the circulation of the working fluid until when the valves 37 are completely shut circulation of the fluid will have ceased entirely and the driving and following shafts will be hydraulically locked together giving a direct drive. In this condition the torque transmitted will be wholly static.

Reverse driving is effected by operating the spindle 43 whereby oppositely directed nozzles and sets of vanes are brought into action as previously described causing a reversed dynamic torque to be applied to the following shaft. It may be noted that since the static and dynamic torques are now opposed reverse drive is only applicable when the dynamic is in excess of the static torque and is, therefore, limited to reverse speeds of the following or driven shaft below half the speed of the driving shaft.

Figure 7:
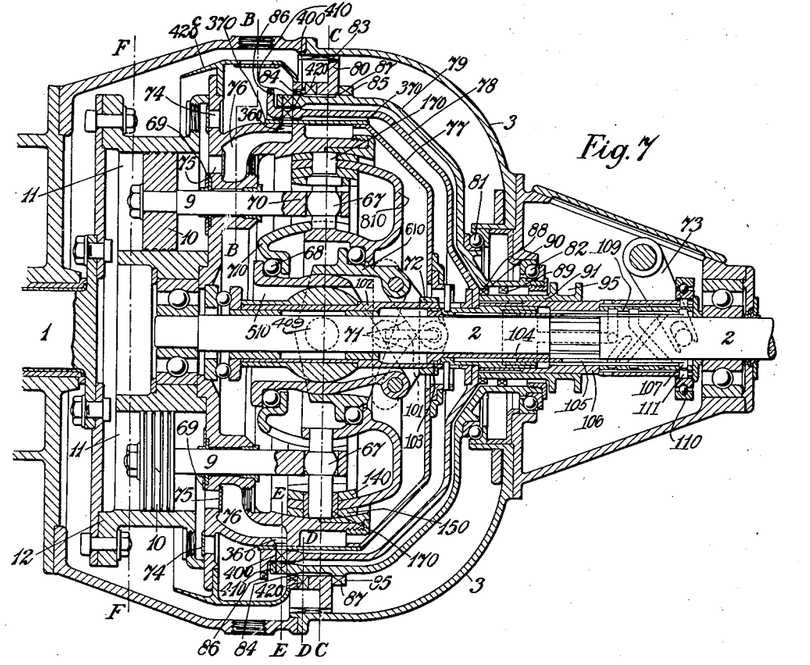
Figure 7 is a sectional side elevation of another form of gear in accordance with the invention.
Figure 8:
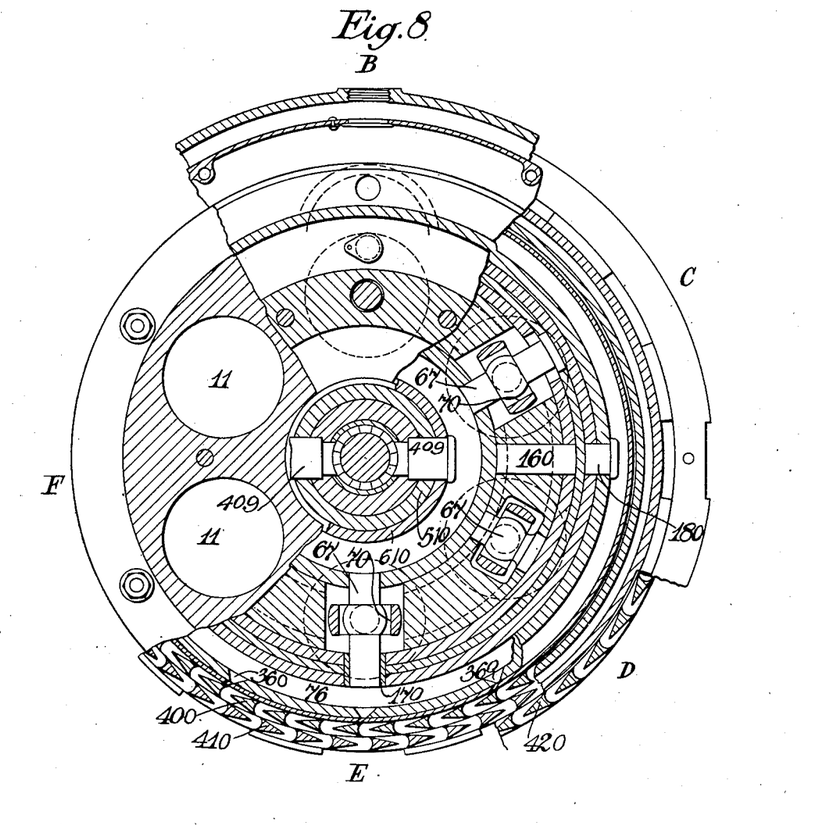
Figure 8 is a part sectional end elevation of Figure 7 and in which the portions B, C, D, E, F are sections on the lines B—B, C—C, D—D, E—E, F—F of Figure 7.
Figure 9:
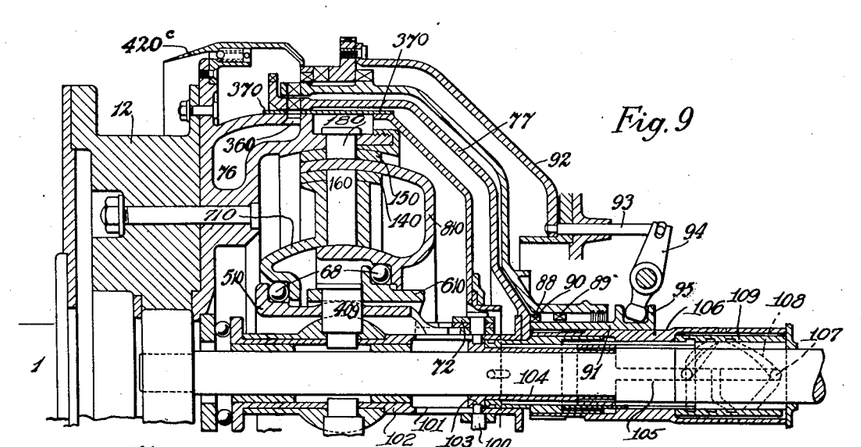
Figure 9 is a half sectional plan of Figure 7.

Referring to the form of gear illustrated in Figures 7, 8 and 9 a cylinder block 12 is secured to the driving shaft 1 and is formed with a plurality of bores 11 in which pistons 10 are reciprocated through the medium of connecting rods 9, gudgeon pins 67 and tilting rings 710, 810 by tilting members 510, 610 which are pivoted by trunnions 409 to the following shaft 2 and engage the tilting rings through ball bearings 68. The connecting rods 9 being rigidly secured to the pistons 10 are arranged to slide in the cylinder block 12 through sealing glands 69 and are formed at their ends with slots 70 to engage ball-shaped portions of the pins 67. The tilting rings 710, 810 are universally connected to one another and to the cylinder block 12 by gimbal rings 140, 150, and pins 160, 170, 180. Mechanism to impart tilt to the members 510 and 610 comprises toggle links 71 pivotally connected thereto and to a ring 72. The pins 100 which connect the links to the ring pass through axial slots 101 in the sleeve 102 and engage a circumferential groove 103 in an inner sleeve 104 slidable upon shaft 2. This sleeve is connected to axial strips 105 passing through deep castellations connecting shaft 2 to outer sleeve 106. The strips 105 are provided with pins 107 at their extremities and the latter engage cam grooves 108 formed in a rotatably mounted sleeve 109. Rotation of this sleeve imparts the necessary axial travel to these strips and thence to the ring 72, this rotary motion being imparted by the double purpose ball bearing collar 110, operated by the lever 73, through the medium of pins 111 formed internally and engaging helical slots in the sleeve 106 and axial slots in the intermediate sleeve 109.

The cylinders 11 are provided with non-return inlet and outlet valves 74, 75 of which the latter communicate with an annular pressure chamber 76 provided at its periphery with a plurality of nozzles 360. The nozzles 360 are under the control of a single sleeve valve 370 carried by a member 77 arranged for axial sliding in association with the means for operating the tilting members 510, 610, the arrangement being such that progressive operation of the lever 73 will first move the members 510, 610 to their positions of maximum tilt and then subsequently move the sleeve valve 370 to close the nozzles 360. Vane rings 400, 410, 420 surround the nozzles 360 and are carried by the members 78, 79, 80 of which the member 79 is rotatably mounted on the casing 3 by ball bearings 81, 82, the member 78 is rotatably mounted on the following shaft and the member 80 is slidably keyed to the casing 3 as at 83. The member 80 is formed with dogs 84, 85 arranged for alternative engagement with dogs 86, 87 carried by the members 78, 79 respectively. These latter members are provided at their hubs with other dogs 88, 89 arranged for alternative engagement with dogs 90 carried by a member 91 slidably but non-rotatably connected to the following shaft 2. Interconnecting means are provided between the members 80 and 91 comprising a link member 92, a sliding pin 93 and an operating lever 94 engaging with collars 95 formed on the member 91 so that by movement of an external operating lever the members 78, 79 may be alternatively clutched to the following shaft member 91 or to the stationary member 80. Thus as shown in Figures 7 and 9 and in the portion E of Figure 8 the member 78 may be clutched to the following shaft through the dogs 88, 90 while the member 79 is clutched to the stationary member 80 through the dogs 85, 87, this condition corresponding to forward drive. Alternatively, the member 78 may be held stationary by the dogs 84, 86 while the member 79 is clutched to the following shaft by the dogs 89, 90. In this latter condition, which corresponds to reverse drive, the additional vane ring 420 is brought into action.

A shroud 420ᶜ encloses and directs the circulation of the working fluid.

Operation of the gear is in all other respects similar to that of the form of gear previously described. The working fluid with which the casing is filled is entrained, by reciprocation of the pistons, through the inlet valves 74 being expelled through the outlet valves 75 into the pressure chamber 76 and issuing thence through the nozzles 360 impinges upon the vane rings. The arrangement of a pressure chamber and inlet valves serves to effect a substantially uniform discharge through the nozzles. The driving action partakes, as before, of a combination of static and dynamic torques.

Referring to the form of the gear illustrated in Figures 10 to 13, tilting members 500ª, 600ª pivotally mounted on the driving shaft 1 by trunnions 409ª carry tilting rings 700ª, 800ª on double row ball bearings 136. Bell cranks 137 pivotally mounted on a cylinder block 12 and engaging with slots 138 formed in the rings 700ª, 800ª serve to transmit oscillatory motion of the said rings through the medium of links 139 to pistons 10 arranged to slide in radial bores 11 formed in the cylinder block 12. The members 500ª, 600ª are interconnected so as to tilt together in opposite directions by arms 140 extending from the member 500ª and slotted at their ends to engage with pins 141 carried by arms 142 integrally formed with the member 600ª. This latter member may be tilted by sliding plungers 143 engaged therewith and with cam surfaces 144 formed on the cam member 145, which cam member is arranged to slide axially within the driving shaft 1 by means of the lever 146 operating through the medium of a collar 147, sliding keys 148 arranged to slide axially on the following shaft, pins 149 secured to the said keys and a collar 150 rotatably mounted on the said cam member.

Figure 10:
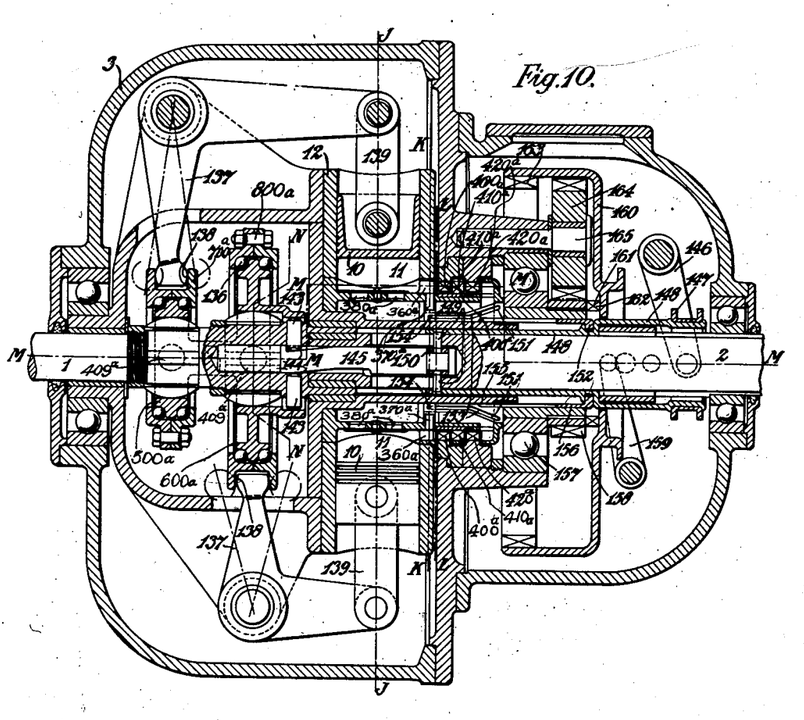
Figure 10 is a sectional side elevation of another form of gear in accordance with the invention.
Figure 11:
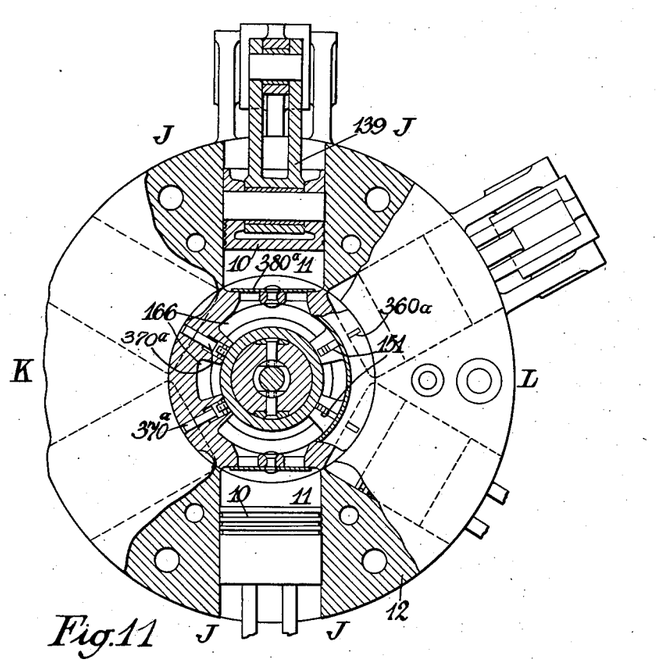
Figure 11 is a part sectional end elevation of Figure 10 and in which the portions J, K, L are sections on the lines J—J, K—K, L—L of Figure 10.
Figure 12:
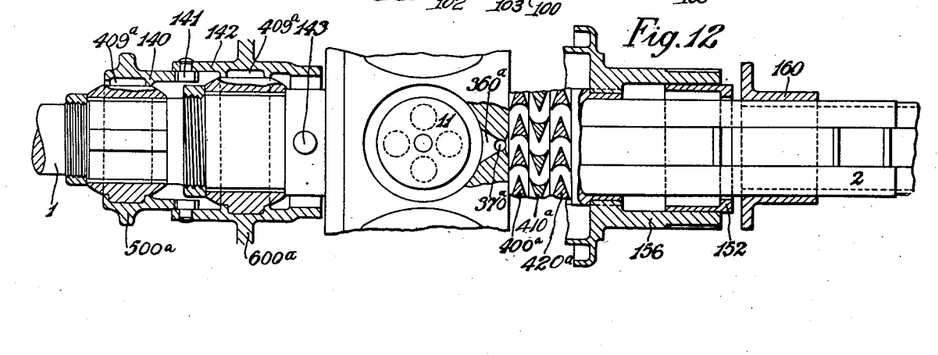
Figure 12 is a part sectional plan of the gear taken on the line M—M of Figure 10.

The cylinder bores 11 are provided with non-return inlet valves 380ª and nozzles 360ª under the control of radially slidable valves 370ª. Axially slidable cam members 151 connected to the sliding keys 148 by lugs 152 are formed with a slot 153 which is partly disposed parallel to the driving shaft axis and partly inclined thereto, the valves 370ª being provided with pins 154 to engage with the said slot.

Adjacent to the nozzles 360ª are three axially disposed rings of vanes 400ª, 410ª, 420ª of which the first and last rings 400ª, 420ª are secured to the casing of the gear while the intermediate ring 410ª is carried by the rotatable cylinder block 12.

Figure 13:
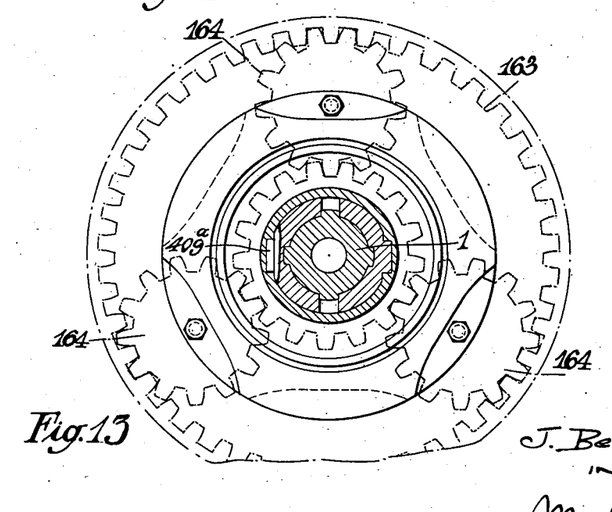
Figure 13 is a part sectional end elevation of this gear taken on the line N—N of Figure 10 and illustrating diagrammatically the reverse gear.

The cylinder block 12 is mounted for rotation about the driving and following shafts 1, 2 and is provided with a sleeve-like extension 155 to which is keyed a further sleeve member 156 which is supported by a ball bearing 157 and has a pinion 158 secured thereto. Forward or reverse drive is respectively obtained by operating a lever 159 to move a member 160 slidably splined to the following shaft 2, either to engage dogs 161 formed on the said member with dogs 162 formed on the pinion 158, or to engage internal teeth 163 carried at its periphery with pinions 164 which are permanently enmeshed with the pinion 158 and mounted for rotation about pins 165 secured to the casing of the gear.

Operation of the gear resembles that of the first two examples above described. Reciprocation of the pistons 10 causes the working fluid to be entrained through the inlet valves 380ª and expelled through the nozzles 360ª past the valves 370ª to impinge upon the vanes 400ª etc. returning thence by way of passages 166 to the inlet valves 380ª. The arrangement of the control mechanism provides that progressive operation thereof will initially move the members 500ª, 600ª to their position of maximum tilt, subsequently closing the nozzles 360ª by means of the valves 370ª. During the first part of this operation the plungers 143 engage the inclined portions of the surfaces 144 while the pins 154 of the valves 370ª "dwell" in the parallel portions of the slots 153. During the second part of the operation the plungers 143 "dwell" on the parallel portions of the surfaces 144 whilst the pins 154 are engaged by the inclined portions of the slots 153.

It is to be understood that the invention is not limited to the above details and arrangements but is capable of various modifications depending upon any particular requirements or practical conditions it may be desired to fulfil, the improved mechanism being capable of application in any case where a variable drive or retarding action in any direction is desired such, for instance, as in self-propelled vehicles on land, air or sea, factory drives, machine tools, manipulation of heavy guns, drawbridges, turntables, cranes, lifts and the like.

Having now described my invention, what I claim as new and desire to secure by Letters Patent is:—

1. Hydraulic variable transmission mechanism comprising in combination, a driving shaft and a driven shaft, a reciprocating pump for positively circulating the working fluid comprising a revoluble cylinder block and cylinders therein, pistons in the cylinders and conections between the pistons and cylinders and the shafts for circulating the fluid, said connections including a tilting or swash plate for operating the pump, means for varying the stroke of the pump, the pump having an orifice at its outlet for forming and directing a jet of the working fluid discharged from the orifice, means for varying the size of the jet opening from zero to a maximum and a vane system, including vanes carried by a stationary part of the mechanism and vanes carried by the driven shaft, operated upon by the jets so as to aid in imparting to the driven shaft the dynamic torque created from the kinetic energy of the working fluid.

2. Hydraulic variable transmission mechanism comprising in combination, a driving shaft and a driven shaft, a plurality of reciprocating pumps for positively circulating the working fluid comprising a revoluble cylinder block and cylinders therein, pistons in the cylinders and connections between the pistons and cylinders and the shafts for circulating the fluid, said connections including a tilting or swash plate for actuating the pumps, means for adjusting the stroke of the pumps, said pumps each having an orifice forming outlets for the pumps which orifices form and direct jets of working fluid, means for varying the size of the jet outlets from zero to a maximum and a system of vanes, including vanes carried by a stationary part of the mechanism and vanes carried by the driven shaft, disposed adjacently to the said orifices in close proximity to the latter, said vanes being operated upon by the jets so as to aid in imparting to the driven shaft the dynamic torque created from the kinetic energy of the working fluid.

3. Hydraulic variable speed transmission mechanism comprising in combination a driving shaft and a driven shaft, a pump for positively circulating the working fluid comprising cylinders carried by the driven shaft and pistons for reciprocation within the cylinders, the latter having orifices through which jets of the working fluid may be directed by the action of the pistons, a tilting or swash plate carried by the driving shaft and operatively connected with said pistons, means for adjusting the inclination of the said plate so as to vary the stroke of the pistons, means for adjusting the size of said jet orifices from zero to a maximum and a system of vanes fixed alternately to a stationary part of the mechanism and to the driven shaft, said vanes being arranged so that the jets of fluid from the cylinders pass between them and in such manner that the direction of flow of the fluid is reversed at successive stages and relative thereto.

4. Hydraulic variable speed transmission mechanism comprising in combination a driving shaft and a driven shaft, pumps for positively circulating the working fluid comprising cylinders carried by the driven shaft and pistons mounted for reciprocation within the cylinders, the latter each having a pair of orifices through which jets of the working fluid may be directed from the cylinders, a tilting or swash plate carried by the driving shaft and operatively connected with the said pistons, means for adjusting the inclination of the said plate so as to vary the stroke of the pistons, means for selectively opening to a variable extent one of each pair of said orifices to the respective cylinders and closing the other orifice thereto, two sets of vanes alternately fixed to a stationary part of the mechanism and rotatable with the driven shaft and means for bringing one or the other of the two sets of vanes into operation simultaneously with the selection of a particular said jet orifice for each cylinder so as to secure forward or reverse drive, said vanes being arranged so that the jets of working fluid pass between them.

5. Hydraulic variable speed transmission mechanism comprising in combination a driving and a driven shaft, a pump for positively circulating the working fluid comprising a revoluble cylinder block and cylinders therein, pistons in the cylinders and connections between the pistons and cylinders and the shafts for circulating the fluid, said connections including a tilting or swash plate for actuating said pump, means for adjusting the inclination of said plate so as to vary the stroke of the pump from zero to a maximum, said pump having orifices through which jets of the fluid may be directed, means for varying the size of said orifices from zero to a maximum and a system of vanes, including vanes attached to a stationary part of the mechanism and to the driven shaft, arranged so that the said jets pass between them and in such manner that the direction of flow of the fluid is reversed at successive stages and relative thereto.

6. Hydraulic variable speed transmission mechanism comprising in combination a driving shaft and a driven shaft, a pump for positively circulating the working fluid comprising cylinders carried by the driven shaft and pistons for reciprocation in the cylinders, the said cylinders having pairs of orifices through which jets of the fluid are directed by the action of the pump, a tilting or swash plate carried by the driving shaft and operatively connected with the pistons, said plate comprising inner and outer members to which the pistons are alternately connected, means for bringing one or the other of the orifices of each pair in action (the other orifice being inoperative), means for varying the size of the orifices from zero to a maximum and a system of vanes, including vanes attached to a stationary part of the mechanism and to the driven shaft, arranged so that the jets of fluid pass between them and in such manner that the direction of flow is reversed at successive stages and relative thereto.

7. Hydraulic variable speed transmission mechanism comprising in combination a driving and a driven shaft, a pump for positively circulating the working fluid comprising a revoluble cylinder block and cylinders therein, pistons in the cylinders and connections between the pistons and cylinders and the shafts for circulating the fluid, said connections including a tilting or swash plate for actuating said pump, means for adjusting the inclination of said plate so as to vary the stroke of the pump from zero to a maximum, said pump having orifices through which jets of the fluid may be directed and inlet valves which permit of the return of the fluid thereto, means for varying the size of said orifices from zero to a maximum and a system of vanes, including vanes attached to a stationary part of the mechanism and to the driven shaft, arranged so that the said jets pass between them and in such manner that the direction of flow is reversed at successive stages and relative thereto.

8. Hydraulic variable transmission mechanism comprising in combination, a driving shaft and a driven shaft, a reciprocating pump for positively circulating the working fluid comprising a revoluble cylinder block and cylinders therein, pistons in the cylinders and connections between the pistons and cylinders and the shafts for circulating the fluid, means for varying the stroke of the pump, the pump having an orifice at its outlet for forming and directing a jet of the working fluid discharged from the orifice, means for varying the size of the jet opening from zero to a maximum and a vane system, including vanes carried by a stationary part of the mechanism and vanes carried by the driven shaft operated upon by the jets so as to aid in imparting to the driven shaft the dynamic torque created from the kinetic energy of the working fluid.

9. Hydraulic variable transmission mechanism comprising in combination, a driving shaft and a driven shaft, a reciprocating pump for positively circulating the working fluid comprising a revoluble cylinder block and cylinders therein, pistons in the cylinders and connections between the pistons and cylinders and the shafts for circulating the fluid, said connections including a tilting or swash plate for operating the pump, means for varying the stroke of the pump, the pump having an orifice at its outlet for forming and directing a jet of the working fluid discharged from the orifice, means for varying the size of the jet opening from zero to a maximum, a vane system, including two sets of vanes carried by a stationary part of the mechanism and two sets of vanes carried by the driven shaft arranged to be operated upon by the jets so as to aid in imparting to the driven shaft the dynamic torque created from the kinetic energy of the working fluid, and means for bringing one or the other of each of said sets of vane rings into operation so as to secure forward or reverse drive.

JESSE BEDFORD.